United States Patent
Wang et al.

(10) Patent No.: US 9,673,931 B2
(45) Date of Patent: Jun. 6, 2017

(54) SYSTEM AND METHOD OF SELECTIVE ENCODING FOR ENHANCED SERIALIZER/DESERIALIZER THROUGHPUT

(71) Applicant: Dell Products, LP, Round Rock, TX (US)

(72) Inventors: Minchuan Wang, Austin, TX (US); Stuart Allen Berke, Austin, TX (US); Bhyrav M. Mutnury, Round Rock, TX (US)

(73) Assignee: DELL PRODUCTS, LP, Austin, TX (US)

( * ) Notice: Subject to any disclaimer, the term of this patent is extended or adjusted under 35 U.S.C. 154(b) by 0 days.

(21) Appl. No.: 14/868,321

(22) Filed: Sep. 28, 2015

(65) Prior Publication Data

US 2017/0093521 A1    Mar. 30, 2017

(51) Int. Cl.
*H04L 27/00* (2006.01)
*H04L 1/00* (2006.01)
*H04L 1/20* (2006.01)

(52) U.S. Cl.
CPC .......... *H04L 1/0009* (2013.01); *H04L 1/0002* (2013.01); *H04L 1/203* (2013.01)

(58) Field of Classification Search
CPC ...... H04L 1/0009; H04L 1/0026; H04L 5/006
USPC ........................................ 375/224, 295, 316
See application file for complete search history.

(56) References Cited

U.S. PATENT DOCUMENTS

| | | | |
|---|---|---|---|
| 6,628,725 B1 | 9/2003 | Adam et al. | |
| 7,065,101 B2 | 6/2006 | Ziegler et al. | |
| 2003/0128674 A1* | 7/2003 | Kong | H04B 7/264 370/320 |
| 2005/0068909 A1* | 3/2005 | Chae | H04L 1/0003 370/278 |
| 2005/0128935 A1* | 6/2005 | Tang | H04L 1/0003 370/208 |
| 2014/0226747 A1* | 8/2014 | McCallister | H04L 1/0042 375/285 |
| 2015/0110162 A1 | 4/2015 | Van den Bosch | |

* cited by examiner

Primary Examiner — David S Huang
(74) Attorney, Agent, or Firm — Larson Newman, LLP

(57) ABSTRACT

A serial communication link including first and second components. The first component includes a first management module and a first encoder that provides A-bit/B-bit encoded data to a first channel, where A<B. The second component includes a second management module and a first decoder/bit-error-rate (BER) module that receives the A-bit/B-bit encoded data from the first channel, determines a BER associated with the A-bit/B-bit encoded data, and provides an indication to the second management module when the BER is higher than a threshold BER level. The second management module communicates the indication to the first management module, and the first management module directs the first encoder to provide C-bit/D-bit encoded data to the first channel in response to receiving the indication, where C<D, C<A, and D<B.

20 Claims, 3 Drawing Sheets

SYSTEM AND METHOD OF SELECTIVE ENCODING FOR ENHANCED SERIALIZER/DESERIALIZER THROUGHPUT

FIELD OF THE DISCLOSURE

This disclosure generally relates to information handling systems, and more particularly relates to a system and method of selective encoding for enhanced serializer/deserializer throughput in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
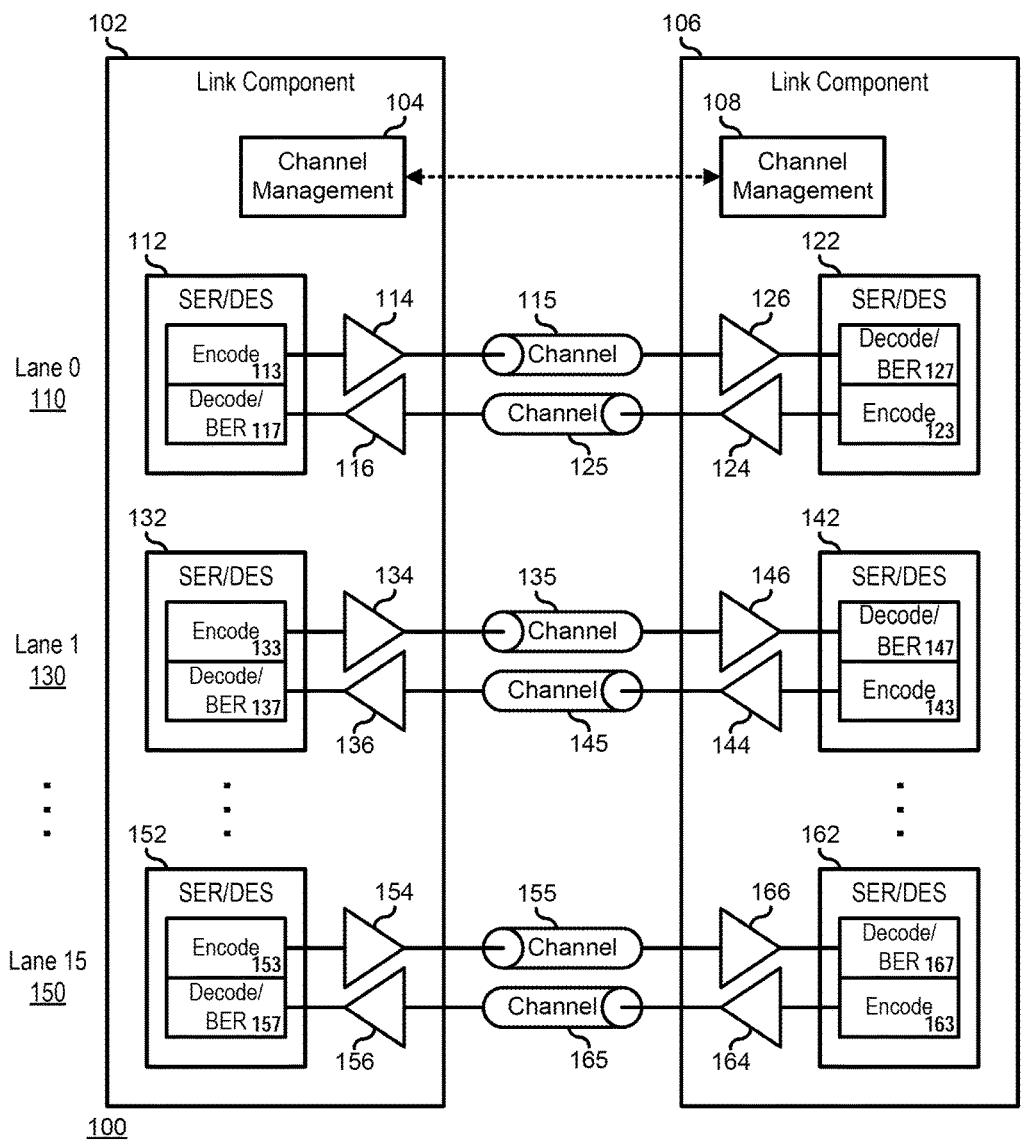
FIG. 1 illustrates a high speed serial link according to an embodiment of the present disclosure.

FIG. 1 illustrates an embodiment of a high speed serial link 100 of an information handling system. For the purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Link 100 provides a communicative connection between two link components 102 and 106. The communicative link is provided by, for example, 16 communication lanes, illustrated by exemplary lanes 110, 130, and 150. Each lane 110, 130, and 150 represents a pair of uni-directional serial data paths. The first path communicates data from component 102 to component 106 via a respective unique point-to-point transmission channels 115, 135, and 155. The second path communicates data from component 106 to component 102 via a respective unique point-to-point transmission channels 125, 145, and 165. Here, components 102 and 106 can be understood to include elements within an information handling system, such as components that are attached to one or more printed circuit board of the information handling system, where transmission channels 115, 125, 135, 145, 155, and 165 can represent one or more circuit traces on the printed circuit board, and can include one or more connectors. Components 102 and 106 can also be understood to include devices of an information handling system, such as a hard drive, a storage array, and the like, that are separate from the printed circuit board of the information handling system, where transmission channels 115, 125, 135, 145, 155, and 165 can include one or more transmission cables. An example of link 100 includes a PCI-Express (PCIe) link that is in compliance with one or more PCIe specification, up to, and including the PCIe 3.1 Specification, a Serial ATA (SATA) link that is in compliance with one or more SATA specification, up to, and including the SATA 3.2 Specification, a SAS link that is in compliance with one or more SAS specification, up to and including the Serial Attached SCSI 3.0 Standard, or another high speed serial channel. For the purposes of the present disclosure, where link 100 represents a PCIe link, the link can represent a standard link, such as a x1 link including one (1) lane, a x4 link including four (4) lanes, a x8 link including eight (8) lanes, or a x16 link including sixteen (16) lanes, or the link can represent a bifurcated link with a non-standard number of lanes, as needed or desired.

Lane 110 includes a serializer/deserializer (SerDes) 112, a transmitter 114, and a receiver 116 in component 102, transmission channels 115 and 125, and a SerDes 122, a transmitter 124, and a receiver 126 in component 106. SerDes 112 includes an encoder module 113 and a decoder and bit error rate (decoder/BER) module 117, and SerDes 122 includes an encoder module 123 and a decoder/BER module 127. In the first path for communicating data from component 102 to component 106, encoder module 113 is connected via an output to an input of transmitter 114, an output of transmitter 114 is connected via transmission channel 115 to an input of receiver 126, and an output of receiver 126 is connected to decoder/BER module 127. In the second path for communicating data from component 106 to component 102, encoder module 123 is connected via an output to an input of transmitter 124, an output of transmitter 124 is connected via transmission channel 125 to an input of receiver 116, and an output of receiver 116 is connected to decoder/BER module 117. Lane 130 includes a SerDes 132, a transmitter 134, and a receiver 136 in component 102, transmission channels 135 and 145, and a SerDes 142, a transmitter 144, and a receiver 146 in component 106. SerDes 132 includes an encoder module 133 and a decoder/BER module 137, and SerDes 142 includes an encoder module 143 and a decoder/BER module 147. Lane 150 includes a SerDes 152, a transmitter 154, and a receiver 156 in component 102, transmission channels 155 and 165, and a SerDes 162, a transmitter 164, and a receiver 166 in component 106. Ser/des 152 includes an encoder module 153 and a decoder/BER module 157, and SerDes 162 includes an encoder module 163 and a decoder/BER module 167. The first and second paths of lanes 130 and 150 are configured similarly to the first and second lanes of lane 110.

Component 102 includes a channel management module 104, and component 106 includes a channel management module 108. Channel management module 104 is communicatively connected to channel management module 108 in order to manage link 100. In a particular embodiment, the communication between management module 104 and channel management module 108 represent a separate sideband communication channel between components 102 and 106. In another embodiment, the communication between management module 104 and channel management module 108 represent management traffic between components 102 and 106 that is communicated over one or more of lanes 110, 130, and 150. In yet another embodiment, the communication between management module 104 and channel management module 108 represent management traffic between other elements of an information handling system that includes link 100, including, for example, a Baseboard Management Controller (BMC), an Integrated Dell Remote Access Controller (IDRAC), a system BIOS, or the like.

Link 100 operates to communicate data at a particular transfer rate, where the transfer rate is determined by a clocking frequency on each lane, a line encoding scheme employed by lanes 110, 120, and 130, and the number of lanes in the link. For example, where link 100 represents a PCIe 1.0 Specification link, the clocking frequency of 1.25 gigahertz (GHz) produces a transfer rate of 2.5 giga-transfers per second (GT/s) per lane. However, the PCIe 1.0 Specification specifies an 8-bit/10-bit (8b/10b) encoding scheme where eight (8) bits of usable information are mapped onto ten (10) bit symbols, so the effective data rate is 2.5 GT/s×8/10=2.0 gigabits per second (Gb/s) per lane. Thus, as an example, a sixteen (16) lane link can have an effective data rate of 2.0 Gb/s×16=32.0 Gb/s, or 4 gigabytes per second (GB/s). Table 1 provides the transfer characteristics for the various PCIe specifications.

TABLE 1

| | | | PCIe performance | |
|---|---|---|---|---|
| | | Transfer | Bandwidth | |
| Version | Encoding | Rate | Per Lane | X16 |
| 1.0 | 8 b/10 b | 2.5 GT/s | 2 Gb/s (250 MB/s) | 32 Gb/s (4 GB/s) |
| 2.0 | 8 b/10 b | 5.0 GT/s | 4 Gb/s (500 MB/s) | 4 Gb/s (8 GB/s) |
| 3.0 | 128 b/130 b | 8.0 GT/s | 7.877 Gb/s (~1 GB/s) | 126 Gb/s (~16 GB/s) |
| 4.0 | 128 b/130 b | 16 GT/s | 15.754 Gb/s (~2 GB/s) | 252 Gb/s (~32 GB/s) |

The transfer rate for link 100 is determined when the link is initially trained based upon and a bit error rate (BER) for the link. The BER is the number of received bits that were mis-detected, or received in error due to noise, interference, distortion, loss of synchronization, and the like, in a communication channel. The bit errors are detectible based upon the received bits being associated with valid symbols of the encoding scheme of link 100. Here, the bit errors for each path of lanes 110, 130, and 150 are detected by decoder/BER modules 117 and 127, 137 and 147, and 157 and 167, respectively, when a synchronized set of ten (10) bits does not represent a valid symbol, and the BER is determined based upon the number of bit errors that are detected.

Channel management modules 104 and 108 direct the training of link 100. During the training, encoders 113, 123, 133, 143, 153, and 163 encode predefined bit sequences for transmission by respective transmitters 114, 124, 134, 144, 154, and 164. The training of link 100 is initiated at a lowest transfer rate. The associated receivers 116, 126, 136, 146, 156, and 166 receive the bit sequences, as modified by the effects of respective channels 115, 125, 135, 145, 155, and 165, any bit errors are detected by respective decoder/BER modules 117, 127, 137, 147, 157, and 167, and the associated BER is there determined for each path. If the BER for each path is within an acceptable limit, then the training of link 100 is redone at a next higher transfer rate. Training continues at higher transfer rates until the BER fails to be within the acceptable limit, and the transfer speed is set to the next lower transfer rate. Note that training of link 100 does not only occur at system initialization, but can be performed at other times and in other circumstances, as needed or desired. For example, when the temperature of one or both of components 102 and 106 changes, channel management modules 104 and 108 can initiate a retraining of link 100. The skilled artisan will recognize that other circumstances can result in a link retraining sequence, and that other activities, such as resetting of compensations settings can be performed during a link retraining, in order to maximize the potential for the successful training of the link at the highest possible transfer rate.

It usually starts from low transfer rate and increases to the highest transfer rate during the link training and initialization. If the lowest transfer rate is having issues during the training and initialization then the link will not even go to the higher speed and always settle at lower speed. After initialization and training, the link at the highest speed can start to have errors (as the real traffic/stress would begin) this is where throttling down to lower speed or shutting down the lanes would happen.

In a particular embodiment, if the BER for any path is above a predefined threshold, then channel management modules 104 and 108 direct that a retraining of link 100 occur at a next lower transfer rate, and so on until all paths exhibit BERs that are within the predefined threshold. For example, where link 100 represents a PCIe 4.0 Specification link, if training of link 100 fails at the 16 GT/s transfer rate, then channel management modules 104 and 108 can direct a retraining of the link at the lower 8 GT/s transfer rate to improve the BER of all paths of the link. However, if the retraining is successful at the lower 8 GT/s transfer rate, then link 100 is limited to the 16 GB/s bandwidth associated with the 8 GT/s transfer rate, and the bandwidth is effectively halved.

In another embodiment, if the BER for any path is above the predefined threshold, then channel management modules 104 and 108 direct that a retraining of half of the lanes of link 100 occur, to eliminate the failing lane or path from the link. For example, where link 100 include sixteen (16) lanes that are trained at the 8 GT/s transfer rate, and one lane fails, then channel management modules 104 and 108 can direct a retraining of the link using only half of the lanes. Here, again, although the remaining lanes are still trained at the high transfer rate, link 100 is limited to an 8 GB/s bandwidth instead of the 16 GB/s bandwidth associated with 16 lanes, and again the bandwidth is effectively halved.

In yet another embodiment, if the BER for any path is above the predefined threshold, then channel management modules 104 and 108 direct that a retraining of link 100 occur at a next lower encoding rate, and so on until all paths exhibit BERs that are within the predefined threshold. For example, where link 100 represents a PCIe 4.0 Specification link, if training of link 100 fails at the 16 GT/s transfer rate and the 128b/130b encoding rate, then channel management modules 104 and 108 can direct a retraining of the link at the same 16 GT/s transfer rate, but at a lower encoding rate, such as at 64b/66b, or 8b/10b, to improve the BER of all paths of the link. Here, if the retraining is successful at the original 16 GT/s transfer rate, but at the lower 64b/66b encoding rate, then link 100 is reduced only to a 64/66×16 GB/s=15.515 GB/s bandwidth, that is, the maximum transfer rate, as limited by the lower encoding rate, a 3% bandwidth reduction. Note that, given a potential imbalance in the ability of a lane operating a reduced encoding rate to keep up an effective bit transfer rate, as compared to other lanes that are operating at a higher encoding rate, the overall transfer rate of the link will likely be limited to the effective transfer rate associated with the lane operating with the lowest encoding rate. However, such a reduction in the overall effective transfer rate is small as compared to reducing the transfer rate of the link to the next lowest transfer rate or reducing the number of lanes in the link.

In a particular embodiment, serial link 100 operates to reduce the encoding rate on all of lanes 110, 130, and 150 to match the lowest encoding rate of the high-BER lane, such that the effective transfer rate for communications from component 102 to component 106 is the same as the effective transfer rate for communications from component 106 to component 102. For example, if a high BER is detected by decoder/BER module 127, then channel management modules 104 and 108 not only lower the encoding rate at encoder module 113, but also lower the encoding rates at encoding modules 123, 133, 143, 153, and 163. In another embodiment, serial link 100 operates to reduce the encoding rate on only one direction of all lanes 110, 130, and 150 to match the lowest encoding rate the high-BER lane, such that the effective transfer rate for communications from component 102 to component 106 is different than the effective transfer rate for communications from component 106 to component 102. For example, if a high BER is detected by decoder/BER module 127, then channel management modules 104 and 108 only lower the encoding rate at encoder modules 113, 133, and 153, but the encoding rates at encoding modules 123, 143, and 163 remains unchanged.

Figure 2:
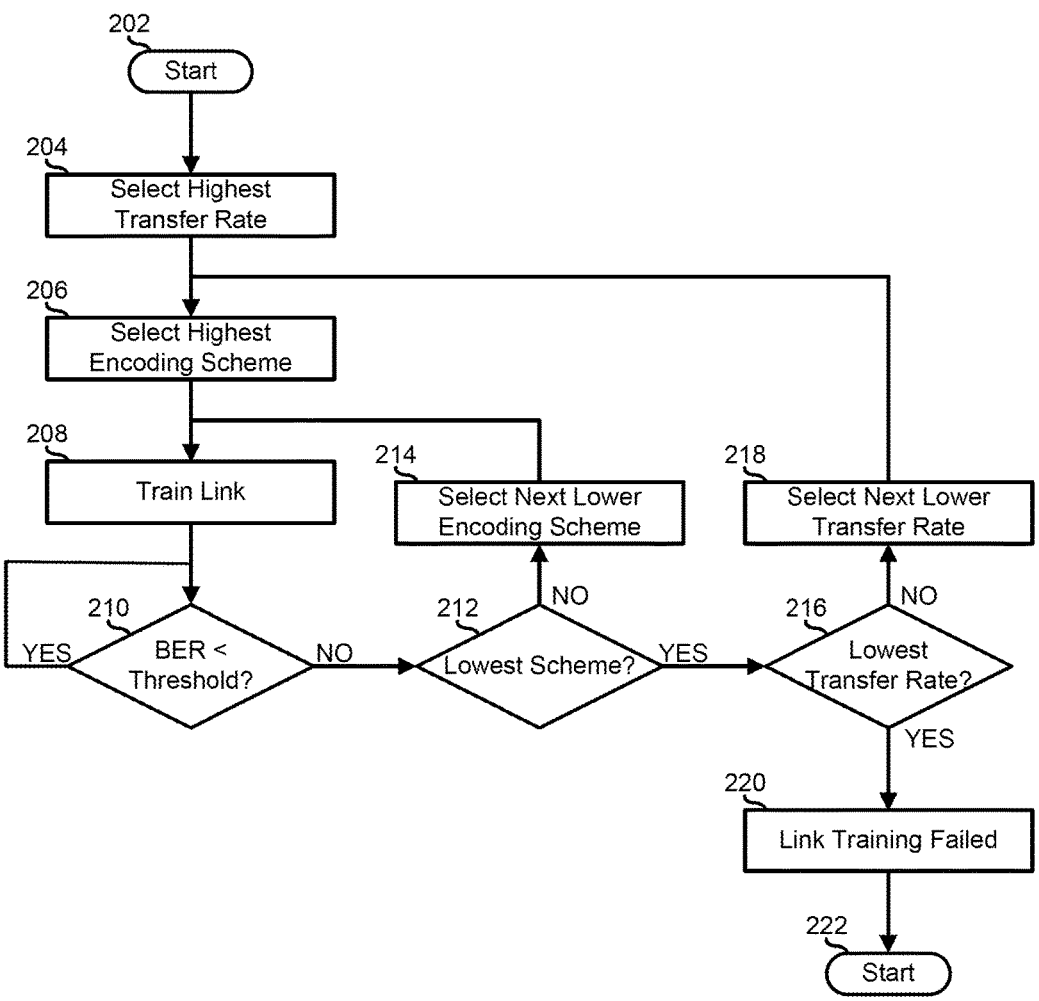
FIG. 2 is a flowchart illustrating a method of selective encoding for enhanced serializer/deserializer throughput in an information handling system according to an embodiment of the present disclosure.

FIG. 2 illustrates a method of selective encoding for enhanced serializer/deserializer throughput in an information handling system, starting at block 202. A highest transfer rate is selected for a serial link in block 204, a highest encoding scheme for the serial link is selected in block 206, and the link is trained in block 208. For example, where link 100 represents a PCIe 4.0 Specification link, the 4 GB/s transfer rate can be selected and the 128b/130b encoding scheme can be selected for initial training A decision is made as to whether or not the BER is below the predetermined threshold in decision block 210. If so, the "YES" branch of decision block 210 is taken and the method remains at decision block 210 until the BER falls below the threshold.

If the BER is not below the predetermined threshold, the "NO" branch of decision block 210 is taken and a decision is made as to whether or not the selected encoding scheme is the lowest encoding scheme in decision block 212. If not, the "NO" branch of decision block 212 is taken, a next lower encoding scheme is selected in block 214, and the method returns to block 208 where the link is retrained. If the selected encoding scheme is the lowest encoding scheme, the "YES" branch of decision block 212 is taken and a decision is made as to whether or not the selected transfer rate is the lowest transfer rate in decision block 216. If not, the "NO" branch of decision block 216 is taken, the next lower transfer rate is selected in block 218, and the method returns to block 206 where the highest encoding scheme for the serial link is selected. If the selected transfer rate is the lowest transfer rate, the "YES" branch of decision block 216 is taken, meaning that, after trying all encoding schemes at all transfer rates, the link has failed training in block 220, and the method ends in block 222.

Figure 3:
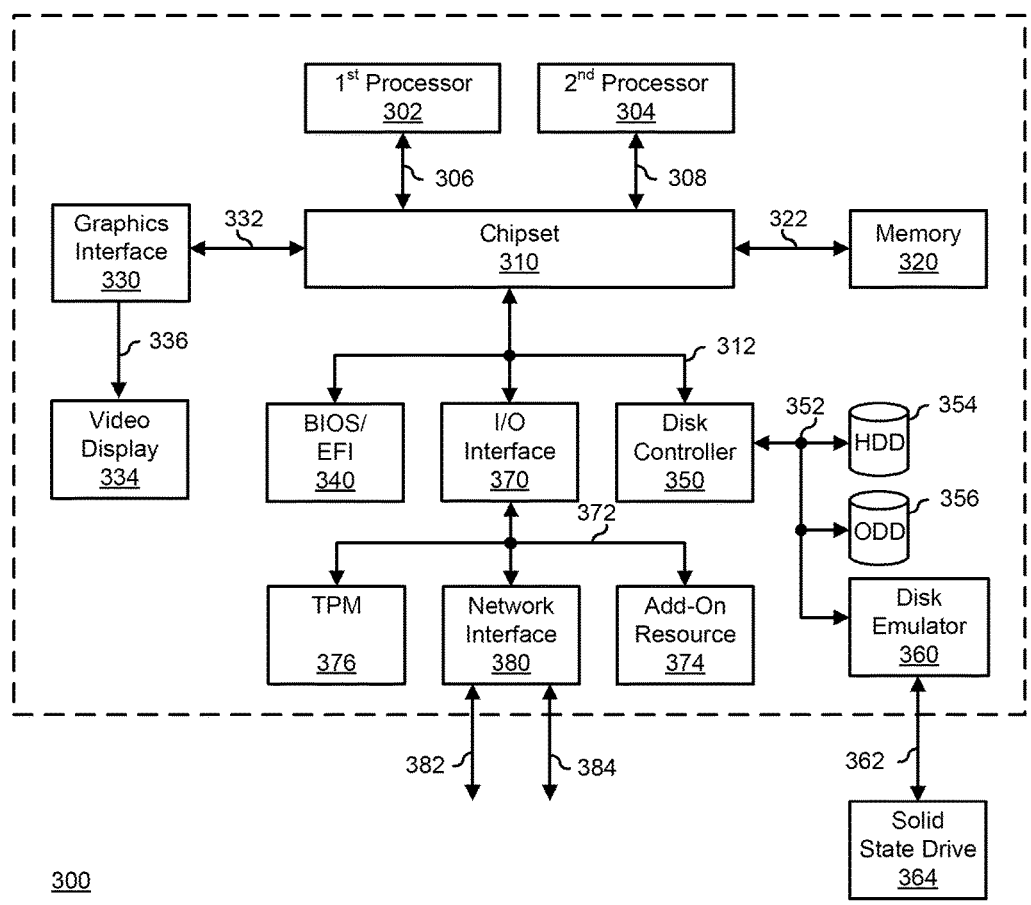
FIG. 3 is a block diagram illustrating a generalized information handling system according to an embodiment of the present disclosure.

FIG. 3 illustrates a generalized embodiment of information handling system 300. For purpose of this disclosure information handling system 300 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 300 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 300 can include processing resources for executing machine-executable code, such as a central processing unit (CPU), a programmable logic array (PLA), an embedded device such as a System-on-a-Chip (SoC), or other control logic hardware. Information handling system 300 can also include one or more computer-readable medium for storing machine-executable code, such as software or data. Additional components of information handling system 300 can include one or more storage devices that can store machine-executable code, one or more communications ports for communicating with external devices, and various input and output (I/O) devices, such as a keyboard, a mouse, and a video display. Information handling system 300 can also include one or more buses operable to transmit information between the various hardware components.

Information handling system 300 can include devices or modules that embody one or more of the devices or modules described above, and operates to perform one or more of the methods described above. Information handling system 300 includes a processors 302 and 304, a chipset 310, a memory 320, a graphics interface 330, include a basic input and output system/extensible firmware interface (BIOS/EFI) module 340, a disk controller 350, a disk emulator 360, an input/output (I/O) interface 370, and a network interface 380. Processor 302 is connected to chipset 310 via processor interface 306, and processor 304 is connected to the chipset via processor interface 308. Memory 320 is connected to chipset 310 via a memory bus 322. Graphics interface 330 is connected to chipset 310 via a graphics interface 332, and provides a video display output 336 to a video display 334. In a particular embodiment, information handling system 300 includes separate memories that are dedicated to each of processors 302 and 304 via separate memory interfaces. An example of memory 320 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 340, disk controller 350, and I/O interface 370 are connected to chipset 310 via an I/O channel 312. An example of I/O channel 312 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 310 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 340 includes BIOS/EFI code operable to detect resources within information handling system 300, to provide drivers for the resources, initialize the resources, and access the resources. BIOS/EFI module 340 includes code that operates to detect resources within information handling system 300, to provide drivers for the resources, to initialize the resources, and to access the resources.

Disk controller 350 includes a disk interface 352 that connects the disc controller to a hard disk drive (HDD) 354, to an optical disk drive (ODD) 356, and to disk emulator 360. An example of disk interface 352 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 360 permits a solid-state drive 364 to be connected to information handling system 300 via an external interface 362. An example of external interface 362 includes a USB interface, an IEEE 1394 (Firewire) interface, a proprietary interface, or a combination thereof. Alternatively, solid-state drive 364 can be disposed within information handling system 300.

I/O interface 370 includes a peripheral interface 372 that connects the I/O interface to an add-on resource 374, to a TPM 376, and to network interface 380. Peripheral interface 372 can be the same type of interface as I/O channel 312, or can be a different type of interface. As such, I/O interface 370 extends the capacity of I/O channel 312 when peripheral interface 372 and the I/O channel are of the same type, and the I/O interface translates information from a format suitable to the I/O channel to a format suitable to the peripheral channel 372 when they are of a different type. Add-on resource 374 can include a data storage system, an additional graphics interface, a network interface card (NIC), a sound/video processing card, another add-on resource, or a combination thereof. Add-on resource 374 can be on a main circuit board, on separate circuit board or add-in card disposed within information handling system 300, a device that is external to the information handling system, or a combination thereof.

Network interface 380 represents a NIC disposed within information handling system 300, on a main circuit board of the information handling system, integrated onto another component such as chipset 310, in another suitable location, or a combination thereof. Network interface device 380 includes network channels 382 and 384 that provide interfaces to devices that are external to information handling system 300. In a particular embodiment, network channels 382 and 384 are of a different type than peripheral channel 372 and network interface 380 translates information from a format suitable to the peripheral channel to a format suitable to external devices. An example of network channels 382 and 384 includes InfiniBand channels, Fibre Channel channels, Gigabit Ethernet channels, proprietary channel architectures, or a combination thereof. Network channels 382 and 384 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A serial communication link, comprising:
  a first component including a first management module and a first encoder that provides A-bit/B-bit encoded data to a first channel, where A<B and where A and B are non-zero integers; and
  a second component including a second management module and a first decoder/bit-error-rate (BER) module that receives the A-bit/B-bit encoded data from the first channel, determines a BER associated with the A-bit/B-bit encoded data, and provides an indication to the second management module when the BER is higher than a threshold BER level;
  the second management module communicates the indication to the first management module; and
  the first management module directs the first encoder to provide C-bit/D-bit encoded data to the first channel in response to receiving the indication, where C<D, C<A, and D<B, and where C and D are non-zero integers.

2. The serial communication link of claim 1, wherein:
  the first component further includes a second encoder that provides A-bit/B-bit encoded data to a second channel to the second component; and
  the second encoder to continues to provide A-bit/B-bit encoded data to the second channel in response to the indication.

3. The serial communication link of claim 1, wherein:
  the first component further includes a second encoder that provides A-bit/B-bit encoded data to a second channel to the second component; and
  the first management module directs the second encoder to provide C-bit/D-bit encoded data to the second channel in response to receiving the indication.

4. The serial communication link of claim 1, wherein:
  the second component further includes a second encoder that provides A-bit/B-bit encoded data to a second channel to the first component; and
  the second encoder to continues to provide A-bit/B-bit encoded data to the second channel in response to the indication.

5. The serial communication link of claim 1, wherein:
  the second component further includes a second encoder that provides A-bit/B-bit encoded data to a second channel to the first component; and
  the second management module directs the second encoder to provide C-bit/D-bit encoded data to the second channel in response to receiving the indication.

6. The serial communication link of claim 1, wherein an A-bit/B-bit encoding comprises one of a 128-bit/130-bit encoding, a 64-bit/66-bit encoding, and a 32-bit/34-bit encoding.

7. The serial communication link of claim 6, wherein a C-bit/D-bit encoding comprises one of the 64-bit/66-bit encoding, the 32-bit/34-bit encoding, and an 8-bit/10-bit encoding.

8. A method, comprising:
  encoding, by a first encoder in a first component, A-bit/B-bit encoded data to a first channel, where A<B and where A and B are non-zero integers;
  receiving, by a first decoder/bit-error-rate (BER) module in a second component, the A-bit/B-bit encoded data from the first channel;
  determining a BER associated with the A-bit/B-bit encoded data;
  providing an indication when the BER is higher than a threshold BER level; and
  directing the first encoder to provide C-bit/D-bit encoded data to the first channel in response to receiving the indication, where C<D, C<A, and D<B, and where C and D are non-zero integers.

9. The method of claim 8, further comprising:
  encoding, by a second encoder in the first component, A-bit/B-bit encoded data to a second channel to the second component, wherein the second encoder to continues to provide A-bit/B-bit encoded data to the second channel in response to the indication.

10. The method of claim 8, further comprising:
  encoding, by a second encoder in the first component A-bit/B-bit encoded data to a second channel to the second component; and
  directing the second encoder to provide C-bit/D-bit encoded data to the second channel in response to receiving the indication.

11. The method of claim 8, further comprising:
  encoding, by a second encoder in the second component, A-bit/B-bit encoded data to a second channel to the first component, wherein the second encoder to continues to provide A-bit/B-bit encoded data to the second channel in response to the indication.

12. The method of claim 8, further comprising:
  encoding, by a second encoder in the second component A-bit/B-bit encoded data to a second channel to the first component; and
  directing the second encoder to provide C-bit/D-bit encoded data to the second channel in response to receiving the indication.

13. The method of claim 8, wherein an A-bit/B-bit encoding comprises one of a 128-bit/130-bit encoding, a 64-bit/66-bit encoding, and a 32-bit/34-bit encoding.

14. The method of claim 13, wherein a C-bit/D-bit encoding comprises one of the 64-bit/66-bit encoding, the 32-bit/34-bit encoding, and an 8-bit/10-bit encoding.

15. A non-transitory computer-readable medium including code for performing a method, the method comprising:
    encoding, by a first encoder in a first component, A-bit/B-bit encoded data to a first channel, where A<B and where A and B are non-zero integers;
    receiving, by a first decoder/bit-error-rate (BER) module in a second component, the A-bit/B-bit encoded data from the first channel;
    determining a BER associated with the A-bit/B-bit encoded data;
    providing an indication when the BER is higher than a threshold BER level; and
    directing the first encoder to provide C-bit/D-bit encoded data to the first channel in response to receiving the indication, where C<D, C<A, and D<B, and where C and D are non-zero integers.

16. The computer-readable medium of claim 15, the method further comprising:
    encoding, by a second encoder in the first component, A-bit/B-bit encoded data to a second channel to the second component, wherein the second encoder to continues to provide A-bit/B-bit encoded data to the second channel in response to the indication.

17. The computer-readable medium of claim 15, the method further comprising:
    encoding, by a second encoder in the first component A-bit/B-bit encoded data to a second channel to the second component; and
    directing the second encoder to provide C-bit/D-bit encoded data to the second channel in response to receiving the indication.

18. The computer-readable medium of claim 15, the method further comprising:
    encoding, by a second encoder in the second component, A-bit/B-bit encoded data to a second channel to the first component, wherein the second encoder to continues to provide A-bit/B-bit encoded data to the second channel in response to the indication.

19. The computer-readable medium of claim 15, the method further comprising:
    encoding, by a second encoder in the second component A-bit/B-bit encoded data to a second channel to the first component; and
    directing the second encoder to provide C-bit/D-bit encoded data to the second channel in response to receiving the indication.

20. The computer-readable medium of claim 15, wherein an A-bit/B-bit encoding comprises one of a 128-bit/130-bit encoding, a 64-bit/66-bit encoding, and a 32-bit/34-bit encoding, and a C-bit/D-bit encoding comprises one of the 64-bit/66-bit encoding, the 32-bit/34-bit encoding, and an 8-bit/10-bit encoding.

* * * * *